United States Patent Office 3,106,547
Patented Oct. 8, 1963

3,106,547
PRODUCING FAST-CURING NOVOLAC RESINS
Robert B. McTaggart and Elwood F. Jackson, Wilbraham, and Rodney M. Huck, Longmeadow, Mass., assignors to Monsanto Chemical Company, St. Louis, Mo., a corporation of Delaware
No Drawing. Filed Aug. 20, 1959, Ser. No. 834,948
8 Claims. (Cl. 260—57)

The present invention relates to the production of novolac resins and more particularly to the production of resins of this type exhibiting fast-cure rates, together with excellent processing characteristics and thermal stability.

Novolac resins result from catalytic condensation type reactions carried on between aldehydes and phenols. The reaction is generally considered as taking place in two stages. The initial stage is that in which addition of the reactants to one another takes place, with or without partial condensation, producing an intermediate reaction product. This is followed by the second stage or that in which completion of condensation takes place with water splitting off the intermediate reaction product to form the final resin product or novolac. For purposes of this disclosure, the reaction in toto will be referred to as the resinification reaction and the stages will generally be referred to as the initial and the second stages.

Earlier novolac resins have been produced by condensation reactions using less than one mol of aldehyde per mol of phenol, the same being carried out under strong acid conditions, more specifically at pH's of less than about 3, generally implemented by the use of strong inorganic acid catalysts.

Recently, reactions have been suggested which are designed to produce novolacs having shortened curing times. The first of these proposes that specific catalysts be used, which are the oxides of metals such as zinc, magnesium and aluminum. More recently, another catalytic process has been proposed with which to produce fast-curing novolac resins. The catalysts used by this process are organic salts of metals such as manganese, zinc and cadmium. Both of the preceding processes, however, require an excess of phenol. This has been found necessary in order to prevent gelation of the reaction mixture during the second stage of the resinification. This excess of phenol detracts from the usefulness of the product in that it tends to contribute after dehydration a soft resin product rather than one which is desirably brittle and capable of being ground. To remove the excess phenol and relieve this condition, adds further expense to the process already costly as a result of initially charging excess phenol.

Accordingly, it is the principal object of the present invention to produce novolac resins having shortened curing times.

Another object is to produce novolac resins exhibiting excellent processing characteristics and thermal stability.

Other objects of the invention will in part be obvious and will in part appear hereinafter.

These and other objects of the present invention are attained by a catalytic resinification reaction process which comprises reacting aldehyde with phenol in mol ratio of up to one mol of an aldehyde per mol of phenol at a temperature of 100–270° C. and a pH of 1–7, using in said resinification reaction a catalyst selected from the class consisting of benzoic acid, hydroxy substituted benzoic acids, methyl substituted benzoic acids, carboxy substituted benzoic acids, anhydrides of carboxy substituted benzoic acids and mixtures of the same.

The following examples are given in illustration of the invention. Where parts are mentioned, parts by weight are intended unless otherwise described.

EXAMPLE I

One hundred parts phenol (1.06 mols), 65 parts formalin (37% formaldehyde) (.80 mol) and 2 parts benzoic acid are charged into a reaction bomb. The charged medium has a pH of 2.75. The bomb is sealed and provided with an ambient temperature of about 155° C. by placing the same in an oil bath. This is maintained for a period of about 50 minutes. During this period, which incidentally covers the entire resinification reaction, i.e., both the addition and condensation, e.g., initial and second stages, a temperature peak of about 160° C. is observed. After removal from the oil bath, the bomb is cooled to about 95° C., opened and the reaction product removed. The reaction product is then dehydrated in a vacuum oven starting at 10 in./Hg and 90° C. and taken to an end point of 28 in./Hg and 130–135° C. over a period of 4 hours. The novolac resin product, which results is in the form of a hard brittle lump exhibiting a transparent, amber-colored appearance.

EXAMPLE II

The procedure of Example I is repeated except that the catalyst used is 2 parts salicylic acid and the medium exhibits a pH of 2.30. The reaction exhibits a peak temperature of 167° C. and the period required for the resinification reaction is 30 minutes. The novolac resulting after the dehydration step is again in brittle lump form exhibiting a transparent, amber colored appearance.

EXAMPLE III

One hundred parts of phenol, 65 parts of 37% formalin and 2 parts of benzoic acid, providing a pH of 2.75, are again charged into a bomb. The bomb is sealed and a temperature of 175° C. is provided to the same for 20 minutes. The peak temperature observed is 195° C. With the completion of the resinification reaction, the resin product is dehydrated in the manner set forth in Example I. The brittle novolac which results exhibits the same appearance as the resin in that example.

EXAMPLE IV

The procedure of Example III is again repeated with the exception that the catalyst used is 2 parts of salicylic acid providing the medium with a pH of 2.30. The reaction exhibits a peak temperature of 211° C. and the time in the heating bath is 13 minutes. The novolac resulting after dehydration exhibits the same appearance as that in Example II.

EXAMPLE V

Individual test samples are provided using equal portions of each of the lump novolac resin products of the preceding examples, which are ground to powder form and simultaneously mixed with 10 parts by weight of hexamethylene tetramine as determined on resin solids.

The cure time for the resins listed in all further examples has been determined by the "dry rubber" technique which is known to those familiar with the art of testing phenolic resins. According to the procedures of this test, the samples are placed on a hot plate maintained at 150° C. and continuously stroked. Under these conditions, the samples pass through the phases: powder, liquid, rubbery and finally the solid or cured phase at which latter phase the product has become thermoset in nature. The time required for the resin to become solidified, and so cured, is designated as the cure time. Incidentally, resins exhibiting shorter cure times are particularly desirable in applications such as metal founding, adhesives, binders, etc. The cure times required for each of the above samples is given in the table which follows. In the same table, the hardness of the cured products is described. The latter results are arrived at when test samples are cured for 2 minutes at 150° C. and observed while being scraped off the hot plate with a razor blade.

*Table I*

| Sample | Catalyst | Resinification Temperature, °C. | Cure Time (Seconds) | Hardness |
|---|---|---|---|---|
| Ex. I | Benzoic Acid | 157 | 35 | Very hard. |
| Ex. II | Salicylic Acid | 157 | 52 | Hard. |
| Ex. III | Benzoic Acid | 175 | 37 | Very Hard. |
| Ex. IV | Salicylic Acid | 175 | 47 | Hard. |

The thermal stability properties of each of the novolac resins is determined by placing equal portions of each of the novolacs of Examples I–IV (without the cross-linking agent, i.e., hexamethylene tetramine) directly into individual test tubes. The uncovered test tubes are placed in a circulating air oven, the air being heated to a temperature of 230° C., for a period of 6 hours. The test tubes are inspected hourly to observe the thermal stability of each of the resins. Each shows discoloration at the surface within the first hour. However, the interiors of each of the resins remains ungelled over the entire 6 hour period. When the same testing procedure is carried out on a dehydrated novolac resin, which is produced by a resinification reaction carried out at atmospheric reflux conditions and using as a catalyst 0.75 part of sulfuric acid and having the same molar ratios of phenol and formaldehyde as the novolacs of Examples I–IV. The resin completely gels during the thermal stability test. This latter resin will be designated "Blank." It has an initial cure time of 70 seconds.

After the thermal stability tests are completed, the identical resin samples are allowed to cool and revert to lump form. These are then compounded with hexamethylene tetramine, 10% by weight of resin solids, and in the manner described earlier their curing times and hardness again observed. The results are as follows:

*Table II*

| Sample | Catalyst | Cure Time (Seconds) | Hardness |
|---|---|---|---|
| Ex. I | Benzoic Acid | 46 | Hard. |
| Ex. II | Salicylic Acid | 100 | Soft. |
| Ex. III | Benzoic Acid | 35 | Hard. |
| Ex. IV | Salicylic Acid | 75 | Soft. |
| "Blank" | Sulfuric Acid | Gels | Gels. |

The conclusion to be derived from the preceding tabulation is that the benzoic acid catalyzed novolacs have exceptional thermal stability whereas the salicylic acid catalyzed novolacs though having less thermal stability than the benzoic acid catalyzed type are still an advance over conventional resins which gel during thermal stability testing and can no longer be cured satisfactorily. The salicylic acid catalyzed embodiment then is adequate for applications having less severe thermal stability requirements than those for which the benzoic acid catalyzed embodiments can be designed.

EXAMPLES VI–XVIII

A number of novolac resins are resinified and dehydrated in the manner of Example I. The reactant and catalyst amounts for each, as well as their reaction temperatures (a) initiation and (b) peak, and the data observed from tests performed in the previously described manner are as follows:

*Table III*

| Ex. No. | Catalyst | Parts Catalyst | pH | Formalin/Phenol Ratio | Reaction Temp., °C. (a) (b) | Cure Time Before[1] | Cure Time After[2] |
|---|---|---|---|---|---|---|---|
| VI | Benzoic Acid | 0.7 | 3.20 | 65/100 | 175–193 | 46 | 53 |
| VII | do | 2 | 2.75 | 65/100 | 175–191 | 41 | 41 |
| VIII | do | 2 | 2.75 | 65/100 | 201–243 | 32 | 25 |
| IX | do | 5 | 2.45 | 65/100 | 202–246 | 26 | 20 |
| X | do | 10 | 2.40 | 65/100 | 199–243 | 29 | 15 |
| XI | do | 2 | 2.70 | 63/100 | 201–253 | 25 | 24 |
| XII | do | 2 | 3.15 | 60/100 | 201–238 | 35 | 35 |
| XIII | Phthalic Anhydride | 2 | 2.65 | 65/100 | 201–254 | 42 | 40 |
| XIV | Terephthalic Acid | 1.8 | 2.40 | 65/100 | 200–241 | 47 | 28 |
| XV | Pyromellitic Dianhydride | 2.3 | 1.70 | 65/100 | 202–260 | 50 | 40 |
| XVI | Salicylic Acid | 2 | 2.30 | 65/100 | 201–249 | 62 | 37 |
| XVII | Oxalic Acid | 2 | 1.18 | 65/100 | 175–231 | 75 | Gels |
| XVIII | Phosphoric Acid | 1 | 1.62 | 65/100 | 175–203 | 42 | Gels |

[1] Before thermal stability testing previously described.
[2] After thermal stability testing previously described.

Again the performance of the novolac resins produced in the manner of the present invention show excellent curing characteristics with those catalyzed by benzoic acid being particularly distinctive. Note in particular, the extended cure time required for the oxalic acid catalyzed novolac prior to stability testing as compared to the cure times required for those products catalyzed in the manner prescribed by the present invention. In addition, both the oxalic acid catalyzed resin of Example XVII and the phosphoric acid catalyzed resin, Example XVIII, gel during the stabilization tests while the novolac products of the present invention do not.

A desirable processing characteristic for novolac resins in many industrial applications is that they exhibit a soft flow over a relatively long period of the total curing cycle (time). Nevertheless the total curing cycle should be as short as possible. In this latter regard, see the preceding tables as to curing times of the novolacs of the present invention. As a consequence, and despite the short curing time, the novolac resins of the present invention distribute well during the curing step resulting in well-bound, homogeneous thermoset products. Another benefit which accrues from this is that comparatively lower molding pressures can result in good cavity fillage.

One procedure for testing flow is that in which 0.5 gram novolac resin samples are admixed with 10 parts by weight on resin solids of hexamethylene tetramine cross-linking agent, then pelletized into ⅜ inch cylinders, placed flat on a glass plate and heated to 125° C. ± 1° C. in an air-circulating oven. The plate is horizontally positioned for 3 minutes and then inclined 65° from horizontal for an additional 17 minutes. The gravity flow of the resin over the 20-minute period is measured in millimeters.

When the novolac resin products of Examples I–IV, the "Blank" and that of Example XVII, are subjected to the preceding test procedure, the following results are obtained:

Table IV

| Example | Catalyst | Flow In Millimeters |
| --- | --- | --- |
| I | Benzoic Acid | 85 |
| II | Salicylic Acid | 67 |
| III | Benzoic Acid | 61 |
| IV | Salicylic Acid | 92 |
| XVII | Oxalic Acid | 48 |
| "Blank" | Sulfuric Acid | 20 |

The present invention involves a catalytic resinification process with which to provide novolac resins, which comprises reacting aldehyde with phenol in mol ratio of up to one mol of an aldehyde per mol of phenol at a temperature of 100–270° C. and a pH of 1–7, the resinification reaction catalyst being selected from the class consisting of benzoic acid, hydroxy substituted benzoic acids, methyl substituted benzoic acids, carboxy substituted benzoic acids, anhydrides of carboxy substituted benzoic acids and mixtures of the same.

The resinification reaction involves two stages, an initial stage during which the aldehyde and phenol react to form an intermediate product followed by a second stage during which the condensation is completed by splitting off water to form the desired novolac reaction product. Dehydration can be carried out simultaneously with the second stage, or subsequent thereto. While dehydrated novolac resins have been emphasized, those which are partially dehydrated as well as those which remain undehydrated and those which have been dehydrated and later hydrated by adding water thereto have utility as resins and are intended to be included here. The resinification reaction can be carried out either stepwise or continuously depending upon the choice of reaction conditions, more specifically those of temperature and pressure.

The resinification reaction is carried out at temperatures ranging 100° C.–207° C. and more preferably 180° C.–240° C. In this regard, the reaction will show a peak in temperature above that at which the reaction is initiated. This is due to the exothermic nature of both stages and particularly the second stage. In operating at temperatures of this magnitude, a pressurized system is necessary to maintain a liquid system. This can be effected by autonomous or controlled pressure. The pressure will depend on the temperature and should be equal to or greater than the vapor pressure of the reaction medium.

Dehydration of the resin can be carried on during the second stage, however, difficulties will be encountered by the use of vacuum, to wit: it is accompanied by loss of reactants which are necessarily in a volatilized condition because of the temperature of the reaction. Consequently, it is recommended that dehydration be carried on as a separate step following the resinification reaction. A temperature of above approximately 100° C. with or without vacuum can be used for dehydration. In addition to vacuum distillation, other extraction procedures can be used for dehydration.

The reaction catalysts proposed by the present invention consist of benzoic acid, hydroxy substituted benzoic acids such as salicylic acid, methyl substituted benzoic acids such as toluic acid; carboxy substituted benzoic acids, which are dibasic or polybasic acids and include phthalic acid, terephthalic acid, pyromellitic acid, etc.; anhydrides of the carboxy substituted benzoic acids such as phthalic anhydride, pyromellitic dianhydride, etc.; and mixtures of the preceding. The amount of resinification catalyst to be used enjoys a broad range with general useage directed to amounts between the 0.1 to 10.0% by weight based on the amount of phenol. In a more preferred embodiment, a range of 0.5 to 2.0% by weight of reaction catalyst by weight of phenol is used. Within these ranges, variations can result from selection of the reaction catalyst or mixed catalyst as well as solution of starting materials. As a consequence, the pH of the resinification reaction ranges 1–7 and more particularly 1.5–4.0.

The reaction is carried out between aldehydes and phenols. The aldehydes to be used include formaldehyde in its various forms, such as formalin (35–50% formaldehyde), paraform (91–100% formaldehyde) and other aliphatic aldehydes exemplified by acetaldehyde, propionaldehyde and the like; aromatic aldehydes exemplified by benzaldehyde; also cyclic aldehydes such as furfural and the like and mixtures of the same. The phenols to be used include normal phenol and meta substituted phenols such as, methyl, ethyl, phenyl and like substituted phenols and mixtures thereof. The starting amounts of aldehyde to phenol range less than one mol of aldehyde per mol of phenol with the further preference directed to 0.5–0.8 mol of aldehyde per mol of phenol.

It will thus be seen that the objects set forth above among those made apparent from the preceding description are efficiently attained and since certain changes may be made in carrying out the above process and in the resulting resin products without departing from the scope of the invention, it is intended that all material contained in the above description shall be interpreted as illustrative and not in a limited sense.

What is claimed is:

1. A catalytic resinification reaction method for producing fast-curing, thermally stable novolac resins which consists of reacting an aldehyde with phenol in mol ratio of less than one mol of aldehyde per mol of phenol at a temperature of 100–270° C. and at a pH of 1–7, the resinification reaction catalyst being present at the start of said reaction and being selected from the class consisting of benzoic acid, hydroxy substituted benzoic acids, methyl substituted benzoic acids, carboxy substituted benzoic acids, anhydrides of carboxy substituted benzoic acids and mixtures of the same.

2. The method according to claim 1 wherein 0.5 to 0.8 mol of formaldehyde is reacted with each mol of phenol and the pH of the resinification reaction is 1.5–4.0.

3. A catalytic resinification reaction method for producing fast-curing, thermally stable novolac resins which consists of reacting 0.5–0.8 mol of formaldehyde with each mol of phenol in the presence of a resinification reaction catalyst constituting benzoic acid the said catalyst being present at the start of said reaction and, said reaction being carried out at a pH of 1.5—4.0 at a temperature of 100–270° C.

4. A method for producing fast-curing, thermally stable novolac resins which consists of reacting 0.5–0.8 mol of formaldehyde with each mol of phenol in the presence of a resinification reaction catalyst constituting salicylic acid said catalyst being present at the start of said reaction and, said reaction being carried out at a pH of 1.5—4.0 at a temperature of 100–270° C.

5. A catalytic resinification reaction method for producing fast-curing, thermally stable novolac resins which consists of reacting 0.5–0.8 mol of formaldehyde with each mol of phenol in the presence of a resinification reaction catalyst constituting terephthalic acid the said catalyst being present at the start of said reaction and, said reaction being carried out at a pH of 1.5–4.0 at a temperature of 100–270° C.

6. A catalytic resinification reaction method for producing fast-curing, thermally stable novolac resins which consists of reacting 0.5–0.8 mol of formaldehyde with each mol of phenol in the presence of a resinification reaction catalyst constituting phthalic anhydride the said catalyst being present at the start of said reaction and, said reaction being carried out at a pH of 1.5–4.0 at a temperature of 100–270° C.

7. A catalytic resinification reaction method for producing fast-curing, thermally stable novolac resins which consists of reacting 0.5–0.8 mol of formaldehyde with each mol of phenol in the presence of a resinification reaction catalyst constituting pyromellitic dianhydride the said catalyst being present at the start of said reaction and, said reaction being carried out at a pH of 1.5–4.0 at a temperature of 100–270° C.

8. A fast-curing, thermally stable novolac resin of the type produced by reacting formaldehyde with phenol in mol ratio of 0.5–0.8 mol of formaldehyde to each mol of phenol in the presence of about 2.0% of benzoic acid catalyst based on the phenol and at a pH of 1.5—4.0 at a temperature of 100–270° C., the said catalyst being present when reaction is initiated.

References Cited in the file of this patent

UNITED STATES PATENTS

| | | |
|---|---|---|
| 1,020,594 | Aylsworth | Mar. 19, 1912 |
| 1,102,634 | Aylsworth | July 7, 1914 |
| 1,232,620 | Stiasny | July 10, 1917 |
| 1,475,446 | Pollak | Nov. 27, 1923 |
| 1,720,052 | Norton | July 9, 1929 |
| 1,756,252 | Lougovoy | Apr. 29, 1930 |
| 2,097,109 | Sutter | Oct. 26, 1937 |
| 2,149,805 | Butler | Mar. 7, 1939 |
| 2,411,557 | Schuh | Nov. 26, 1946 |
| 2,838,473 | Partansky | June 10, 1958 |
| 3,020,254 | Leos et al. | Feb. 6, 1962 |

FOREIGN PATENTS

| | | |
|---|---|---|
| 222,503 | Great Britain | Sept. 26, 1924 |

OTHER REFERENCES

Ellis: Chemistry of Synthetic Resins, vol. 1, page 328, Reinhold, 1935. (Copy in Sci. Lab.)

Martin: The Chemistry of Phenolic Resins, pages 110–116, John Wiley, 1956.